(12) United States Patent
Peng et al.

(10) Patent No.: US 6,544,911 B2
(45) Date of Patent: Apr. 8, 2003

(54) FIBER MATS FOR MATERIALS OF CONSTRUCTION HAVING IMPROVED TEAR STRENGTH AND PROCESS FOR MAKING SAME

(75) Inventors: Qinyun Peng, Pine Brook, NJ (US); Krishna Srinivasan, Mahwah, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 36 days.

(21) Appl. No.: 09/759,043

(22) Filed: Jan. 12, 2001

(65) Prior Publication Data

US 2001/0009834 A1 Jul. 26, 2001

Related U.S. Application Data

(63) Continuation-in-part of application No. 09/484,749, filed on Jan. 18, 2000.

(51) Int. Cl.[7] ............................................. B32B 27/12
(52) U.S. Cl. ....................... 442/157; 442/160; 442/170; 442/171; 442/172; 442/176; 442/178; 442/180; 442/301; 428/292.1; 428/297.4; 428/299.4; 428/489; 428/505; 428/524; 156/164.4; 52/514; 52/514.5; 52/518; 52/534; 52/537; 106/218; 106/243; 106/246; 106/273.1; 106/275; 106/276; 106/282
(58) Field of Search ................................ 52/514, 514.5, 52/518, 534, 537; 106/218, 243, 246, 273.1, 275, 276, 277, 278, 282, 284.01, 661, 668, 711; 156/164.4; 428/36.1, 40.3, 40.4, 43, 49, 74, 141, 142, 143, 144, 145, 147, 149, 292.1, 297.4, 299.4, 489, 505, 524; 442/157, 160, 170, 171, 172, 176, 178, 180, 301

(56) References Cited

U.S. PATENT DOCUMENTS

| 3,922,472 A | * 11/1975 | Foley et al. ............. 427/434.6 |
| 4,258,098 A | * 3/1981 | Bondoc et al. .......... 156/331.3 |
| 4,335,186 A | 6/1982 | Marzocchi et al. ......... 428/375 |
| 4,430,465 A | 2/1984 | Abbott ........................ 524/64 |
| 4,500,600 A | 2/1985 | Wong et al. ................ 428/391 |
| 4,596,737 A | 6/1986 | Werbowy et al. ........... 428/228 |
| 4,749,614 A | 6/1988 | Andrews et al. ............ 428/290 |
| 4,917,764 A | 4/1990 | Lalwani et al. ............. 162/156 |
| 4,931,318 A | 6/1990 | Romberger et al. ...... 427/397.7 |
| 5,032,431 A | 7/1991 | Conner et al. ........... 427/389.8 |
| 5,503,920 A | 4/1996 | Alkire et al. ............... 428/288 |
| 5,518,586 A | 5/1996 | Mirous ....................... 162/156 |
| 5,744,229 A | 4/1998 | Gleason et al. .......... 428/297.4 |
| 5,804,254 A | 9/1998 | Nedwick et al. ......... 427/389.8 |
| 5,851,933 A | 12/1998 | Swartz et al. ............... 442/180 |

FOREIGN PATENT DOCUMENTS

WO     WO99/13154     3/1999

OTHER PUBLICATIONS

BASF's Apr. 1998 "Non-wovens and Coatings Dispersions".

* cited by examiner

*Primary Examiner*—Cheryl A. Juska
*Assistant Examiner*—Arti R. Singh
(74) *Attorney, Agent, or Firm*—Marilyn J. Maue; William J. Davis; Walter Katz

(57) ABSTRACT

The invention relates to a coated fiber mat of improved tear strength upon dividing pieces of the coated mat and the coating which comprises a cured, non-woven, fiber glass mat containing a polysiloxane wherein the fibers are fixedly distributed in a formaldehyde type binder containing a binder modifier which is a crosslinked styrene/acrylic polymer, and to a process for the preparation of the mat.

12 Claims, 1 Drawing Sheet

Figure 1:
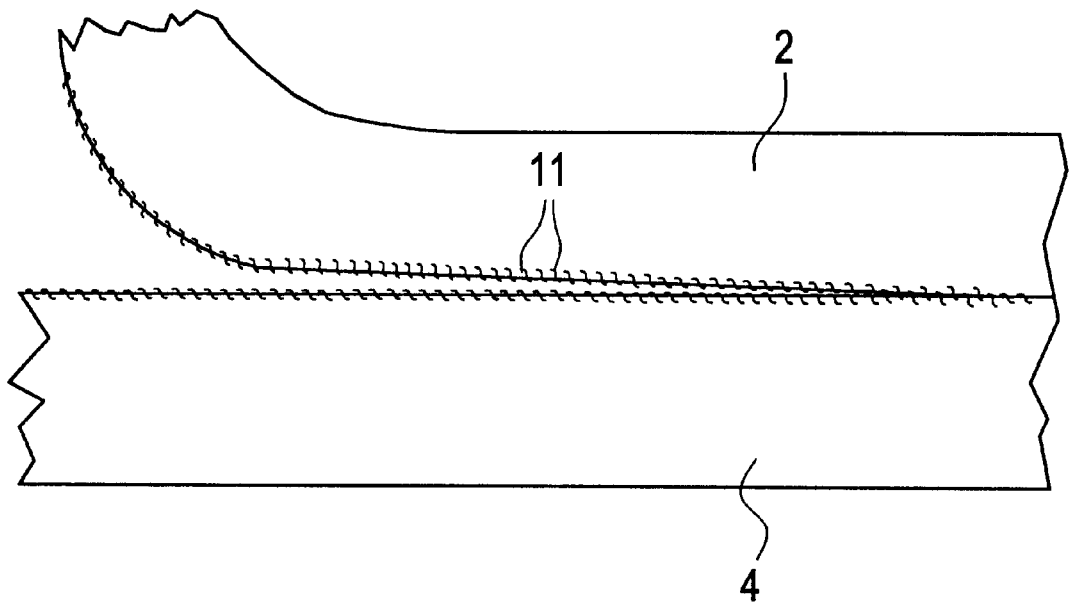

FIBER MATS FOR MATERIALS OF CONSTRUCTION HAVING IMPROVED TEAR STRENGTH AND PROCESS FOR MAKING SAME

This invention is a continuation-in-part of co-pending U.S. patent application Ser. No. 09/484,749, still pending, filed Jan. 18, 2000 by Qinyun Peng et al.

BACKGROUND OF THE INVENTION

1. Field of the Invention

This invention involves a cured, siloxane containing, non-woven fiber mat containing a binder mixture which can be suitably employed as a roofing or other building composite requiring improved tear strength.

2. Description of the Prior Art

Various methods to improve mat strength and stability of non-woven fibrous mats have been devised which are described in many patents and publications, representative of which are the following.

U.S. Pat. No. 4,335,186 discloses a chemically modified asphalt composition wherein the asphalt is reacted with a nitrogen-containing organic compound capable of introducing to the asphalt functional groups which can serve as reactive sites to establish a secure chemical bond between the asphalt and reinforcing fillers blended into the asphalt, such as glass fibers and siliceous aggregates.

U.S. Pat. No. 4,430,465 discloses an article of manufacture comprising a mat of fibers, such as glass fibers, coated with a composition comprising asphalt, an alkadiene-vinylarene copolymer, a petroleum hydrocarbon resin and an anti-stripping agent of a branched organic amine.

U.S. Pat. No. 5,518,586 discloses a method of making a glass fiber mat comprising dispersing glass fibers in an aqueous medium containing hydroxyethyl cellulose to form a slurry; passing the slurry through a mat forming screen to form a wet fiber glass mat; applying a binder comprising urea-formaldehyde resin and a water-insoluble anionic phosphate ester and a fatty alcohol to the wet glass fiber mat; and curing the binder.

U.S. Pat. No. 5,744,229 discloses a glass fiber mat made with polymer-reacted asphalt binder. The binder of the glass fiber mat comprises an aqueous emulsion of polymer modified asphalt produced by reaction of asphalt, a surfactant and a phenol-, resorcinol-, urea- or melamine-formaldehyde resin.

U.S. Pat. No. 5,851,933 describes a non-woven fibrous mat comprising glass fibers bonded with a cured mixture of urea/formaldehyde resin and a self crosslinkable vinyl acrylic/polyvinyl acetate copolymers and U.S. Pat. No. 5,334,648 describes emulsion copolymers for use as a urea formaldehyde resin modifier.

U.S. Pat. No. 4,917,764 describes a glass fiber mat having improved strength featuring a carboxylated styrene-butadiene latex.

U.S. Pat. No. 5,804,254 describes a method for flexibilizing cured urea formaldehyde resin-bound glass fiber nonwovens.

U.S. Pat. No. 5,503,920 describes a process for improving parting strength of fiberglass insulation.

U.S. Pat. No. 5,032,431 describes a glass fiber insulation binder.

U.S. Pat. No. 4,931,318 describes silica as a blocking agent for fiberglass sizing.

U.S. Pat. No. 4,749,614 describes a fibrous substrate coated with a hydrolyzed amino silane useful for preparing polyepoxide substrates.

U.S. Pat. No. 4,596,737 describes a process for treating a glass fiber mat comprising contacting the surface of a cured mass of glass fibers with a latex polymer.

U.S. Pat. No. 4,500,600 describes glass fibers coated with a size composition comprising γ-aminopropyltriethoxysilane and an alkoxysilane.

PCT WO 99/13154 describes a structural mat matrix comprising a substrate of fiberglass fibers and wood pulp and a binder which consists of urea formaldehyde and acrylic copolymer.

BASF's April 1998 advertising brochure entitled NON-WOVENS AND COATINGS DISPERSIONS discloses a crosslinked styrene/acrylic polymer (ACRONAL® S 886S) useful as a binder for glass substrates.

Copending U.S. patent application Ser. No. 09/484,749 discloses a fiber glass mat roofing composite, a urea/formaldehyde resin binder and a polysiloxane adhesion modifier.

SUMMARY OF THE INVENTION

In accordance with this invention there is provided a cured, polysiloxane containing, non-woven, fibrous mat comprising from about 60 to about 95 wt. % fibers containing from about 0.001 to about 15 wt. % polysiloxane; which fibers are fixedly distributed in from about 40 to about 5 wt. % of a formaldehyde type binder containing between about 0.1 and about 20 wt. % of a crosslinked styrene/acrylic or methacrylic, [designated herein as (meth)acrylic], copolymer as a binder modifier.

Although several methods of making non-woven fiber mats can be used to form the present mat, a wet laid process wherein the fibers are dispersed in white water to form a wet web derived from a slurry or mat is preferred. Optionally a dispersing agent, emulsifier, lubricant, defoamer, surfactant and/or other conventional excipients can be added to the fiber containing slurry of the present invention. In a mat forming machine such as a paper pulp apparatus, e.g. a Fourdrinier paper machine, excess water is removed from the fiber slurry to form the web and the modified binder of this invention, as a 5 to 40% aqueous solution, dispersion or emulsion is then applied to the wet web by use of a curtain coater or a dip and squeeze or knife edge applicator. Alternatively, the modified binder can be sprayed onto the wet web. Following binder saturation of the web, excess binder is removed and a web containing a siloxane polymer is then dried and cured at a temperature of between about 200°–400° C. for a period of from a few seconds to about 5 minutes. The siloxane can be introduced after or in admixture with the modified binder solution, or, if desired, a portion or all of the siloxane can be introduced into the fiber size or slurry before addition of binder. The siloxane component is employed in the form of a solution, suspension, emulsion or dispersion in water or in an organic solvent, such as isopropanol, cyclohexanol or other inert organic solvent. For the purposes of the present invention, a coating of polysiloxane or asphalt can be added as a top coat on the cured mat.

DETAILED DESCRIPTION OF THE INVENTION

The preferred cured fiber mat of the present invention comprises by weight from about 68 to about 92% fiber containing from about 0.01 to about 10% polysiloxane and from about 8 to about 32% formaldehyde type binder containing between about 0.05 and about 15% of a 0.05 to about 10% crosslinked styrene/acrylic polymer modifier.

The formaldehyde type binder base is a thermosetting resin of formaldehyde in combination with urea, phenol, resorcinol, melamine or mixtures thereof. Of these, the formaldehyde/urea binder base is preferred. The binder base contains a binder modifying amount of a styrene/acrylic resin containing a polyfunctional component which crosslinks with the copolymer resin during curing of the mat. The styrene component of the resin can be unsubstituted or substituted on a ring carbon atom with lower alkyl, vinyl, allyl, chloro or phenyl; however, from the standpoint of economics; notwithstanding the reduced flammability and high thermal stability of some of these substituted types, unsubstituted styrene is most desired. The styrene/acrylic resin, which includes both acrylic and methacrylic moieties and mixtures thereof, contains a minor amount, e.g. between about 0.05 to 10 wt. %, preferably between about 0.1 and about 5 wt. %, of a crosslinking agent which may be a nitrogen containing crosslinking agent, such as a polyfunctional amine, amide or acrylonitrile, or may be any other polyfunctional crosslinking agent such as for example a di- or tri-olefinically unsaturated hydrocarbon or other conventional crosslinker reactive with the styrene/acrylic copolymer. Of the above polymer compositions, those providing self-crosslinkable characteristics are preferred. The (meth)acrylic polymer is generally a mixture of (meth)acrylates and additionally may contain (meth)acrylonitriles, (meth)acrylic acid and/or (meth)acrylamides as comonomers. One advantage of the present modified binder is that it allows for curing at a lower temperature than would otherwise be required for a mat containing siloxane/formaldehyde type binder alone. It is believed that this benefit is attributable to the crosslinking of the modifier. Another advantage is a degree of flexibility contributed by the styrene comonomer.

The fibers of the present mat can be fibers of glass, wood pulp or particles, polyethylene, polypropylene, polyester, nylon, ORLON®* or mixtures of these fibers depending on the end use of the product. More specifically, for roofing shingles, acoustical boards, BUR and other asphaltic composites at least a major portion of glass fibers are employed and unmixed glass fibers are most desired. For facers or underlayment used in different articles of building construction, e.g. divider panels, other synthetic fibers or wood chips fixed in a mat can be utilized.

The mat fibers generally have an average length of from about 3 to abut 140 mm and an average diameter of from about 5 to about 25 micrometers. Short and long fibers can be mixed to form a mat web of increased fiber entanglement.

The polysiloxane component of the mat is most preferably employed at a concentration of between about 0.05 and about 5% with respect to the modified binder and is a polysiloxane having repeating units of —[Si—O]—. The siloxane polymer can be modified with various substituents which include linear, branched or aromatic end-groups optionally containing oxygen, sulfur and/or nitrogen. Generally the present polysiloxanes are classified as polyalkyl-, polyaryl-, polyalkylaryl- and polyether-siloxanes. The polysiloxanes found to be most useful in the present invention are those having a weight average molecular weight of at least 600. The polysiloxanes listed in following Table 1 are representative.

* a polyacrylonitrile (polyvinyl cyanide) continuous synthetic filament

TABLE 1

| Polysiloxane | Mol. Wt. |
| --- | --- |
| Polyalkylene oxide-modified polydimethylsiloxane-dimethylsiloxane copolymer | 13,000 |
| Polyalkylene oxide-modified polydimethylsiloxane-dimethylsiloxane copolymer | 3,000 |
| Polyalkylene oxide-modified polydimethylsiloxane-dimethylsiloxane copolymer | 4,000 |
| (Carboxylatepropyl)methylsiloxane-dimethylsiloxane copolymer | >1,000 |
| Dimethylsiloxane-(60% PO-40% EO) block copolymer | 20,000 |
| (Hydroxyalkyl functional) methylsiloxane-dimethylsiloxane copolymer | 5,000 |
| Aminopropylmethylsiloxane-dimethylsiloxane copolymer | 4,500 |
| Aminoethylaminopropylmethoxysiloxane-dimethylsiloxane copolymer | >1,000 |
| Glycidoxy propyl dimethoxy silyl end blocked dimethyl siloxane polymer | 5,000 |
| Methacryloxy propyl dimethoxy silyl dimethyl siloxane polymer | 40,000 |
| Vinyl dimethoxy silyl end-blocked dimethyl siloxane polymer | 6,500 |
| Aminoethylaminopropyl dimethoxy silyl end blocked dimethyl siloxane polymer | 3,800 |
| Amine-alkyl modified methylalkylaryl silicone polymer | 7,800 |
| Epoxy functional dimethylpolysiloxane copolymer | 8,300 |
| Dimethylpolysiloxane | 26,439 |
| Dodecylmethylsiloxane-hydroxypolyalkyleneoxypropyl methylsiloxane copolymer | 1,900 |
| (Dodecylmethylsiloxane)-(2-phenylpropylmethylsiloxane) copolymer | >1,000 |
| Polyalkylene oxide-modified polydimethylsiloxane-dimethylsiloxane copolymer | 600 |

OTHER PUBLICATIONS

The modified binder of the present invention alters the interfacial effect between the mat and a surface coating which promotes fiber "pull out" during force applied to prevent immediate fiber breaking or tearing which occurs during separation of portions of the coated mat when the modifier is omitted. It is believed that the increased tear strength of the composite is due to an interfacial interaction between the coating and the mat containing the present modified binder which dissipates the force applied for separation.

IN THE DRAWING

The accompanying drawing is a top plan view illustrating the separation of a composite which comprises a glass fiber mat having an asphalt coating which penetrates the mat. The portions of the coated mat being separated are indicated by 2 and 4 with fibers 11 bridging the separated area and resisting disunion before total separation occurs.

For the manufacture of roofing shingles or BUR, a polysiloxane containing fiberglass mat with a urea/formaldehyde binder and the present crosslinked polymer modifier is preferred. The dried, cured mat may be covered on one or both sides with a conventionally thick coating of a standard asphalt or asphalt compound to produce a composite roofing product which can be cut to any size or shape or used as undivided BUR sheeting and packaged in pallets or rolls for shipment and subsequent installation. In the case of BUR roofing, however, coating or mopping of the mat with a hot surface coating of asphalt is generally delayed until a course of sheeting is installed on the roof. The asphalt employed for coating may additionally contain an antifungal, antibacterial, UV inhibitor and/or coloring agent at the option user.

The styrene/butadiene latex, employed in the examples was supplied Dow Chemical Co. and the urea/formaldehyde binder was obtained from Leste Co.

The results of these tests are as reported in following Table 2.

TABLE 2

| Ex. No. | UF wt. % | SILOXANE wt. % | Acronal S886 S wt. % | STYRENE/BUTADIENE wt. % | TEAR STRENGTH gram force (gf) |
|---|---|---|---|---|---|
| 1 | 99 | — | 1 | — | 1241 |
| 2 | 98 | 1 | 1 | — | 2272 |
| 3 | 97 | 2 | 1 | — | 2415 |
| 4 | 96 | 3 | 1 | — | 3810 |
| 5 | 95 | 4 | 1 | — | 4418 |
| 6 | 97 | 5 | 1 | — | 4143 |
| 7 | 99 | — | — | 1 | 1217 |
| 8 | 98 | 1 | — | 1 | 1455 |

The roof covering herein disclosed is a product of conventional weight and somewhat increased flexibility which meets and exceeds the requirements of ASTM D-3462 testing. The significantly improved tear strength of the present product results in savings in packaging and transportation of the product as well as durability of the product when installed.

Having thus generally described the invention, reference is now had to the following examples which illustrate particular and preferred embodiments but which are not to be construed as limiting to the scope of the invention as set forth in the appended claims.

EXAMPLES 1–8

Testing Tear Strength of 3×2.5 inch Samples of Shingles Employing Glass Fiber Mats With Urea/Formaldehyde (UF) Modified Binder.

Tear test D-1922, as referenced in ASTM D-3462 (Jul. 10, 1997 version), was used to determine the tear strength of various glass fiber mats coated on both sides with a 25 mil coating of asphalt conventionally used in roofing materials. In summary, the test measures the force in grams required to tear apart the coated mat specimen using a pendulum device. Acting by gravity, the pendulum swings through an arc tearing the specimen from a precut slit. The test specimen is held at one end by the pendulum and on the opposite end by a stationary member. The loss in energy by the pendulum is indicated by a scale and pointer which registers in the force required to tear apart the specimen.

To a wet web of 25–100 mm long glass fibers, derived from drainage of a white water slurry, was added at room temperature, a standard urea/formaldehyde binder containing 1 wt. % styrene/acrylate/acrylonitrile polymer modifier (i.e. Acronal S 886 S, supplied by BASF) to provide a fiber to modified binder weight ratio of about 80:20. The web containing fibers and modified binder is then sprayed with an aqueous solution of poly(dimethylsiloxane), supplied by Chem-Trends as product RCTW B9296) to provide a polysiloxane concentration of from 0.25 to 5% with respect to UF, as noted in the following table. The resulting webs were then dried and cured at about 300° C. for a period of 10 seconds to produce cured, non-woven mats, after which the mats were coated on both sides at 215° C. with filled asphalt (comprising 32% w/w asphalt and 68% w/w limestone filler) using a two-roller coater.

It will be understood that many modifications in procedure and substitutions in the compositions of examples 2–6, including substitution of the polysiloxane, binder and binder modifier, as well as fibers or fiber mixtures, can be made without departing from the scope of the present invention and that these examples merely represent preferred embodiments of the invention.

What is claimed is:

1. A cured non-woven fiber mat comprising, by weight, from about 60 to about 95% fibers containing from about 0.001 to about 15% of a polysiloxane; said fibers fixedly distributed in from about 40 to about 5% of a formaldehyde type binder containing between about 0.1 and about 20% of a crosslinked styrene/(meth)acrylic polymer binder modifier.

2. The mat of claim 1 wherein said fibers are fibers of glass, wood, polyethylene, polypropylene, polyester, nylon, polyacrylonitrile or a mixture thereof.

3. The mat of claim 2 wherein the fibers are glass fibers having an average length of from about 3 to about 130 mm and an average diameter of from about 5 to about 25 micrometers.

4. The mat of claim 1 wherein the formaldehyde type binder contains formaldehyde and a compound selected from the group consisting of urea, phenol, resorcinol and melamine or a mixture.

5. The mat of claim 4 wherein the formaldehyde type binder is urea/formaldehyde.

6. The mat of claim 1 wherein the styrene/acrylic polymer is crosslinked with a polyfunctional, nitrogen-containing crosslinking agent.

7. The mat of claim 6 wherein between about 0.05 and about 10% of the styrene/acrylic polymer is crosslinked.

8. The mat of claim 7 wherein between about 1 and about 5% of the styrene/acrylic polymer is crosslinked.

9. The fiber mat of claim 1 wherein the fibers are glass fibers and the mat comprises, by weight, from about 68 to about 92% glass fibers containing from about 0.01 to about 10% polysiloxane; said fibers fixedly distributed in from about 8 to about 32% of urea/formaldehyde binder which contains between about 0.5 and about 15% of a styrene/(meth)acrylic polymer which polymer is from about 0.05 to about 10% crosslinked.

10. The mat of claim 1 wherein said polysiloxane is poly(dimethylsiloxane).

11. The mat of claim 1 wherein the polysiloxane is between about 0.1 and about 2% by weight of said modified binder.

12. An uncured wet web mixture comprising from about 60 to about 95 wt. % glass fibers containing from about 0.001 to about 15 wt % of a polysiloxane and between about 40 and about 5 wt. % of a formaldehyde type binder containing between about 0.1 and about 20 wt. % of a crosslinked styrene/(meth)acrylic polymer for said binder.